Aug. 6, 1957  D. F. PINKERTON ET AL  2,801,677
FOLDING HEAD REST FOR AUTOMOBILE SEATS
Filed July 9, 1956  2 Sheets-Sheet 1
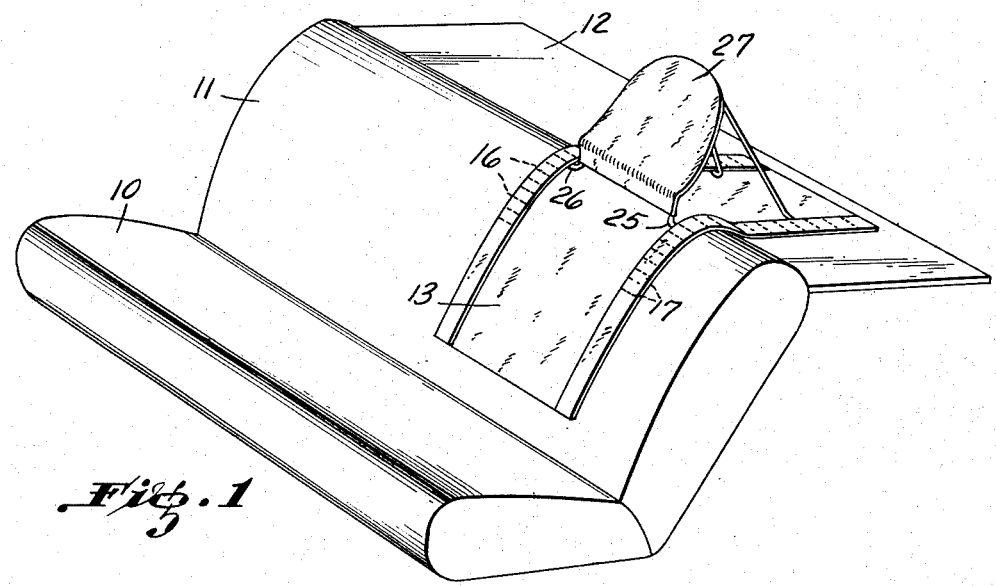
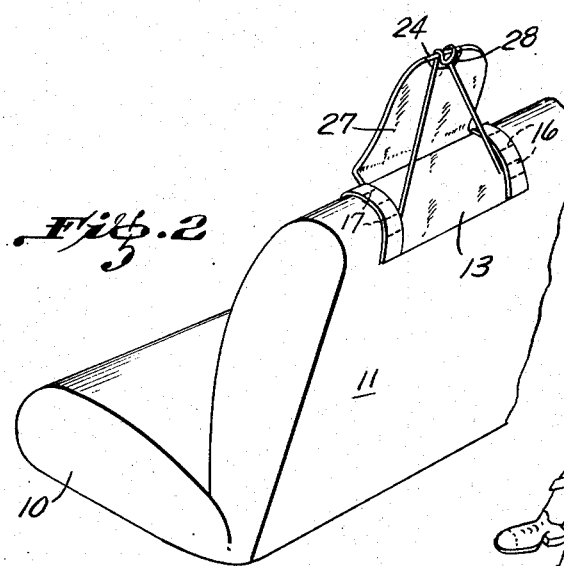
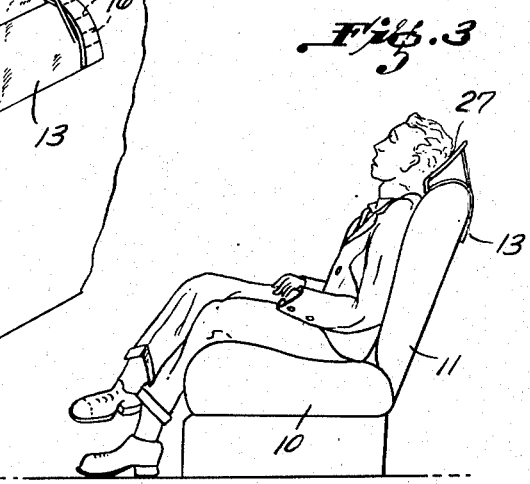
INVENTORS
DALE F. PINKERTON
& JAMES A. MCALLISTER
BY
ATTORNEYS

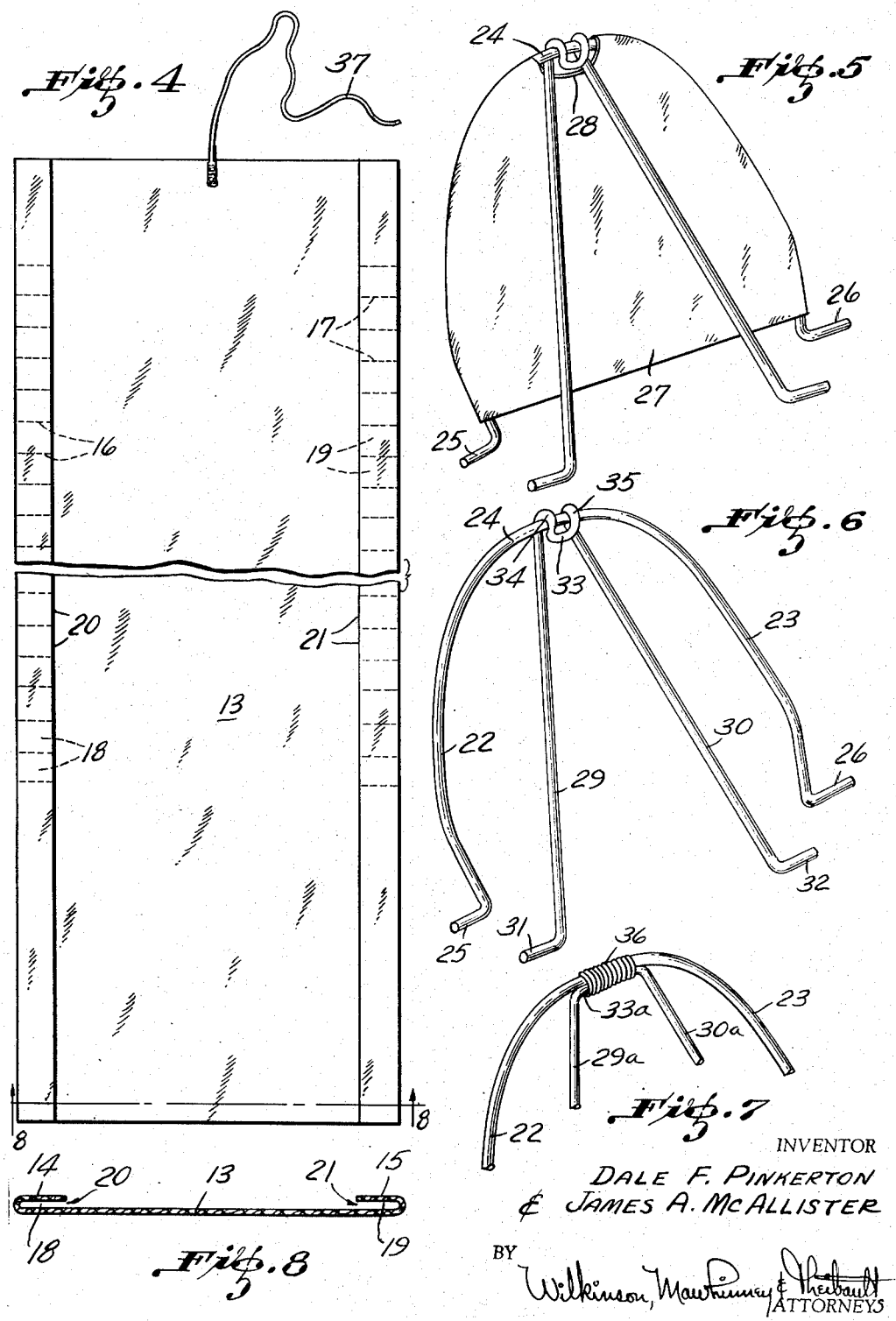

United States Patent Office 2,801,677
Patented Aug. 6, 1957

2,801,677

FOLDING HEAD REST FOR AUTOMOBILE SEATS

Dale F. Pinkerton, San Francisco, and James A. McAllister, San Diego, Calif.

Application July 9, 1956, Serial No. 596,740

3 Claims. (Cl. 155—174)

The present invention relates to folding head rest for automobile seats and has for its general object to provide a portable folding head rest for automobile or other seats to provide comfort and safety or sleeping accommodations for occupants of automobiles, railway trains, airplanes or the like while traveling.

Another object of the invention is to provide a device applicable to chairs, davenports or the like to permit sleeping and relaxation and provide general comfort for persons seated at home, in clubs or elsewhere.

The invention aims to provide adequate head and neck support, at the same time permitting flexibility for adjustment to all reasonable conditions and variations, to provide lateral as well as fore and aft head support thereby facilitating conditions for sleep, and to provide protection from neck injury to occupants when vehicle is struck from behind.

A still further object of the invention is to provide a head rest for the backs of seats which possesses a minimum number of parts and exemplifies simplicity in construction, posing no installation problem.

The invention also has for a further object to provide a head rest which is quickly adaptable to various kinds of chairs and seats and to persons of different heights.

A still further object of the invention is to provide a device which will not mar or otherwise harm the chair or seat surfaces and which forms a neat package for easy transport and stowage by folding into itself, envelope style with tie strings.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a perspective view of the rear seat, seat back and high shelf of a type found in conventional automobiles and illustrating the folding head rest of the invention as applied thereto in a position of use.

Figure 2 is also a perspective view of the front seat of a conventional automobile showing the application of the device of the invention thereto.

Figure 3 is a side elevational view of a vehicle or other seat with the head rest of the invention applied and an occupant of the seat illustrated with his head supported by the head rest.

Figure 4 is a plan view, taken on an enlarged scale, with parts broken away showing a form of flexible mat employed.

Figure 5 is a perspective view of the head rest and brace frames hingedly connected together with a form of head rest cover or casing applied to the head rest frame.

Figure 6 is a perspective view of the head rest and brace frames with the head rest cover removed and showing a form of hinge connection between the frames.

Figure 7 is a fragmentary perspective view of the head rest and brace frames showing a modified form of hinge connection.

Figure 8 is a cross-sectional view taken on the line 8—8 in Figure 4.

Referring more particularly to the drawings and for the present to Figures 1, 2 and 3, 10 designates a seat and 11 a seat back and in Figure 1, 12 designates a high shelf which according to conventional automobile construction extends off the upper rear portion of the back 11 of the rear seat.

Pursuant to the invention, a flexible mat 13 is provided made of cloth, for instance canvas or other desired material and of a desired color and pattern.

As shown in Figures 4 and 8, the edges 14 and 15 of the mat 13 are overlapped and lines of transverse stitching, stapling or other mode of attachment 16 and 17 are made to pass through the overlapped edges 14 and 15 and the main body 13 of the mat at spaced longitudinal intervals so as to provide pockets 18 and 19 with open mouths 20 and 21 which face inwardly and mutually toward one another.

A head rest frame, in one form thereof, consists of resilient side bars 22, 23 joined at their upper ends by a top cross bar 24 and having at their lower ends outturned lugs 25 and 26 which are adapted to enter the pockets 18 and 19 as hereinafter described.

The parts 22, 23, 24, 25 and 26 constitute the head rest frame which may be made of resilient wire or resilient round cross-section metal. The side bars 22, 23 are unconnected at their lower ends and are spring biased to an outwardly spread position, which is so related to the width of the mat 13 that the lugs 25, 26 of the head rest frame are yieldably maintained in the pockets 20 and 21.

This head rest frame is adapted to receive a head rest cover or casing 27. This head rest 27 may be a slip-on canvas or other fabric cover that is made by sewing or fastening together the ends of a fabric piece of proper width and length so that a continuous belt is formed. In other words a double walled casing is formed with the bottom open so that the same may be slipped downwardly over the curved top cross-bar 24 which will facilitate the entry of the head rest frame within the casing 27. At its rear upper portion the cover or casing 27 is provided with a cut-away section 28 to allow the articulation of a brace frame with the top cros sbar 24 of the head rest frame.

This brace frame, as more particularly shown in Figures 5 and 6 comprises resilient side bars 29, 30 having at their lower unconnected ends out-turned lugs 31 and 32, and a cross-connecting member 33 at the upper ends of the resilient side bars 29, 30, with the upper ends of the side bars 29, 30 being curled or rolled into eyes 34, 35 about the top cross-bar 24 of the head rest frame, the cross-bar 33 of the brace frame being preferably crimped into the space between the upper ends of the side bars 29, 30 so as to close the eyes 34, 35 sufficiently to avoid casual or accidental separation of the head rest and brace frames. The two eyes 34, 35 provide bearings for the cross-bar 24 so that the two frames are hinged together for the purpose of adjusting the inclination of the head rest.

Referring more particularly to Figure 7 a modified form of hinge connection is shown in which a helically wound wire or rod 36 is wrapped about the cross-bars 24 and 33ª the latter connecting the upper ends of the resilient side bars 29ª and 30ª.

In Figure 4 a tie cord or ribbon 37 is shown as attached to one end of the mat 13 which may be used for securing the mat in a rolled or folded condition with the head rest and brace frames infolded therein.

In use, as shown in Figures 1, 2 and 3, the flexible mat 13 may be draped over the seat back 11. In Figure 1 the rear overlapped portion of the mat 13 is shown as lying along the shelf 12, but in Figures 2 and 3 the high end of the mat 13 simply conforms to the general contour of the rounded upper edge of the seat back. It will be understood that the fabric upholstery of the seat back and the canvas or other fabric of which the mat 13 is made will be such that considerable friction will develop between the two materials so as to resist creeping or relative movement of the mat 13 on the upholstery material. Moreover the mat is so designed that a substantial portion thereof will lie in front of the seat back so as to be engaged by the occupant, whose weight and pressure on the mat 13 will also tend to resist displacement of the mat relatively to the seat back. In otherwords the mat will retain its adjusted position.

The unitary head rest and brace frames may be adjusted to the mat 13 by compressing the resilient side bars 22, 23 together so that the lugs 25, 26 may be brought opposite the mouths of any of the pockets 20, 21; whereupon the side bars 22, 23 are released and the inherent resiliency of the same will tend to expand the frame so as to spread the lugs 25 and 26 into the registering pockets 20, 21. In like manner the brace frame may be made to engage selected pockets 20, 21 of the mat by squeezing the resilient side bars 29, 30 together, lining the lugs 31, 32 with selected pockets and then releasing the rods 29, 30 so that they may again expand laterally to move the lugs 31, 32 into such pockets. It will be understood that due to the hinge connection between the two frames that the head rest cover or casing 27 may be supported at any inclination desired.

The assembly can be quickly readied for packing or transport by wrapping the flexible mat around the metal frames and securing the package with the attached ties 37. The lugs may either remain in the pockets or be removed from them during stowage.

It will be appreciated that adjustability as well as foldability are beneficial characteristics of the improved device.

The cloth material 27 may be quickly detached from the head rest frame for washing or cleaning.

Although we have disclosed herein the best form of the invention known to us at this time, we reserve the right to all such modifications and changes as may come within the scope of the following claims.

What is claimed is:

1. A head rest for seat backs comprising a flexible mat adapted to be draped over the seat back and having longitudinal series of spaced pockets with open mouths facing toward one another, resilient head rest and brace frames hinged together at their upper ends and having out-turned lugs at their unconnected lower ends spring biased to a spread condition holding the same in said pockets, said frames adapted to be manually compressed to disengage the lugs from the pockets.

2. A head rest for seat backs comprising a flexible mat adapted to be draped over the seat back and having spaced longitudinal series of pockets with open mouths facing one another, head rest and brace frames comprising each pairs of resilient side bars hingedly connected together at their upper ends and being unconnected at their lower ends where out-turned lugs are movable into and out of the pockets by the movement of the resilient side bars together or apart.

3. A head rest for seat backs comprising a flexible fabric mat adapted to be draped over the seat back and having infolded edges secured together along spaced transverse lines at spaced longitudinal points to provide series of pockets with mouths opening inwardly of the pockets, a head rest frame having out-turned parts adapted to enter the pockets, and a brace frame hinged to the head rest frame and also having out-turned parts adapted to enter other of said pockets.

References Cited in the file of this patent
UNITED STATES PATENTS

| | | |
|---|---|---|
| 366,080 | Doubleday | July 5, 1887 |
| 826,805 | Scheibner | July 24, 1906 |
| 1,094,009 | Parkhurst | Apr. 21, 1914 |
| 1,447,486 | Schaffer | Mar. 6, 1923 |
| 2,060,298 | Gailey | Nov. 10, 1936 |
| 2,502,801 | Schott | Apr. 4, 1950 |
| 2,632,497 | Brady | Mar. 24, 1953 |